(12) United States Patent
Boissière et al.

(10) Patent No.: US 11,222,454 B1
(45) Date of Patent: Jan. 11, 2022

(54) SPECIFYING EFFECTS FOR ENTERING OR EXITING A COMPUTER-GENERATED REALITY ENVIRONMENT

(71) Applicant: Apple Inc., Cupertino, CA (US)

(72) Inventors: Clément Pierre Nicolas Boissière, San Francisco, CA (US); Samuel Lee Iglesias, Palo Alto, CA (US); James McIlree, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/176,951

(22) Filed: Feb. 16, 2021

Related U.S. Application Data

(63) Continuation of application No. 16/141,774, filed on Sep. 25, 2018, now abandoned.

(60) Provisional application No. 62/565,852, filed on Sep. 29, 2017.

(51) Int. Cl.
| | | |
|---|---|---|
| *G06T 13/40* | (2011.01) | |
| *G06T 19/00* | (2011.01) | |
| *G06T 15/20* | (2011.01) | |
| *G06F 3/01* | (2006.01) | |
| *G06F 3/16* | (2006.01) | |

(52) U.S. Cl.
CPC .............. *G06T 13/40* (2013.01); *G06T 15/20* (2013.01); *G06T 19/006* (2013.01); *G06F 3/016* (2013.01); *G06F 3/167* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| | | |
|---|---|---|
| 2012/0320080 A1 | 12/2012 | Giese et al. |
| 2013/0246942 A1 | 9/2013 | Merrifield et al. |
| 2014/0004951 A1 | 1/2014 | Kern et al. |
| 2017/0157512 A1 | 6/2017 | Long et al. |

OTHER PUBLICATIONS

Applicant-Initiated Interview Summary received for U.S. Appl. No. 16/141,774, dated Apr. 1, 2020, 3 pages.
Applicant-Initiated Interview Summary received for U.S. Appl. No. 16/141,774, dated Nov. 9, 2020, 3 pages.
Final Office Action received for U.S. Appl. No. 16/141,774, dated Jul. 2, 2020, 14 pages.
Kayakermagic, "Teleport Tones for Second Life", Online Available at https://www.youtube.com/watch?v=4FzzlpwgFEO, Nov. 28, 2012, 3 pages.
Non-Final Office Action received for U.S. Appl. No. 16/141,774, dated Oct. 30, 2019, 11 pages.
Notice of Allowance received for U.S. Appl. No. 16/141,774, dated Nov. 30, 2020, 8 pages.
Themediacows, "X-Men: The Arcade Game Walkthrough—Part 1 [HD] (X360, PS3)", Online Available at: https://www.youtube.com/watch?v=OklbsX1BMPY, Dec. 17, 2010, 3 pages.

*Primary Examiner* — Peter Hoang
(74) *Attorney, Agent, or Firm* — Dentons US LLP

(57) ABSTRACT

In an exemplary process for specifying an entrance or exit effect in a computer-generated reality environment, in response to a user entering or exiting the computer-generated reality environment, a transition effect is provided.

24 Claims, 18 Drawing Sheets

SPECIFYING EFFECTS FOR ENTERING OR EXITING A COMPUTER-GENERATED REALITY ENVIRONMENT

CROSS-REFERENCE TO RELATED APPLICATIONS

This application is a continuation of U.S. patent application Ser. No. 16/141,774, entitled "SPECIFYING EFFECTS FOR ENTERING OR EXITING A COMPUTER-GENERATED REALITY ENVIRONMENT," filed Sep. 25, 2018, which claims priority to U.S. Provisional Patent Application No. 62/565,852, entitled "SPECIFYING EFFECTS FOR ENTERING OR EXITING A VIRTUAL ENVIRONMENT," filed Sep. 29, 2017, the contents of each of which are incorporated by reference in their entireties.

BACKGROUND

1. Field

The present disclosure relates generally to computer-generated reality (CGR) (including virtual reality (VR) and mixed reality (MR)) techniques, and more specifically to techniques for entering or exiting a CGR environment.

2. Description of Related Art

Conventional virtual reality environments include virtual objects called avatars that are associated with user(s) of virtual environments. A user's avatar represents a user's presence in a virtual environment.

BRIEF SUMMARY

The present disclosure describes techniques for enhancing the experience of a user entering or exiting a CGR environment. As CGR environments become more ubiquitous, there is increased opportunity for people to interact in such environments. For example, multiple users of a virtual reality system may gather in a virtual environment for a meeting, to play a game, or for various other reasons. To enhance such an experience, the techniques described below allow a user to preview a CGR environment prior to entering the environment. The techniques also allow a user to customize effects that occur in the environment when the user or another user enters or exits the environment. Although customized effects can add to the entertainment value of CGR environments, it should be recognized that visual effects are equally important for drawing users' attention to changes in attendance in an environment. Such techniques also provide the ability to control or filter content so that, for example, the user is not presented with content provided by another user that the user finds objectionable.

According to some embodiments, data representing an event of a user entering or exiting a virtual environment is received. In response to receiving the data representing the event, a determination is made whether a visual effect has been designated for the event of the user entering or exiting the virtual environment. In accordance with a determination that a visual effect has not been designated for the user, a visual effect corresponding to the received data is obtained and the obtained visual effect is provided. In accordance with a determination that a visual effect has been designated for the user, the designated visual effect is provided.

According to some embodiments, a request to preview a virtual environment is received and a request to enter the virtual environment is received. In response to receiving the request to preview the virtual environment, a preview of the virtual environment is provided, and an entrance transition effect is not provided. In response to receiving the request to enter the virtual environment, the entrance transition effect is provided.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
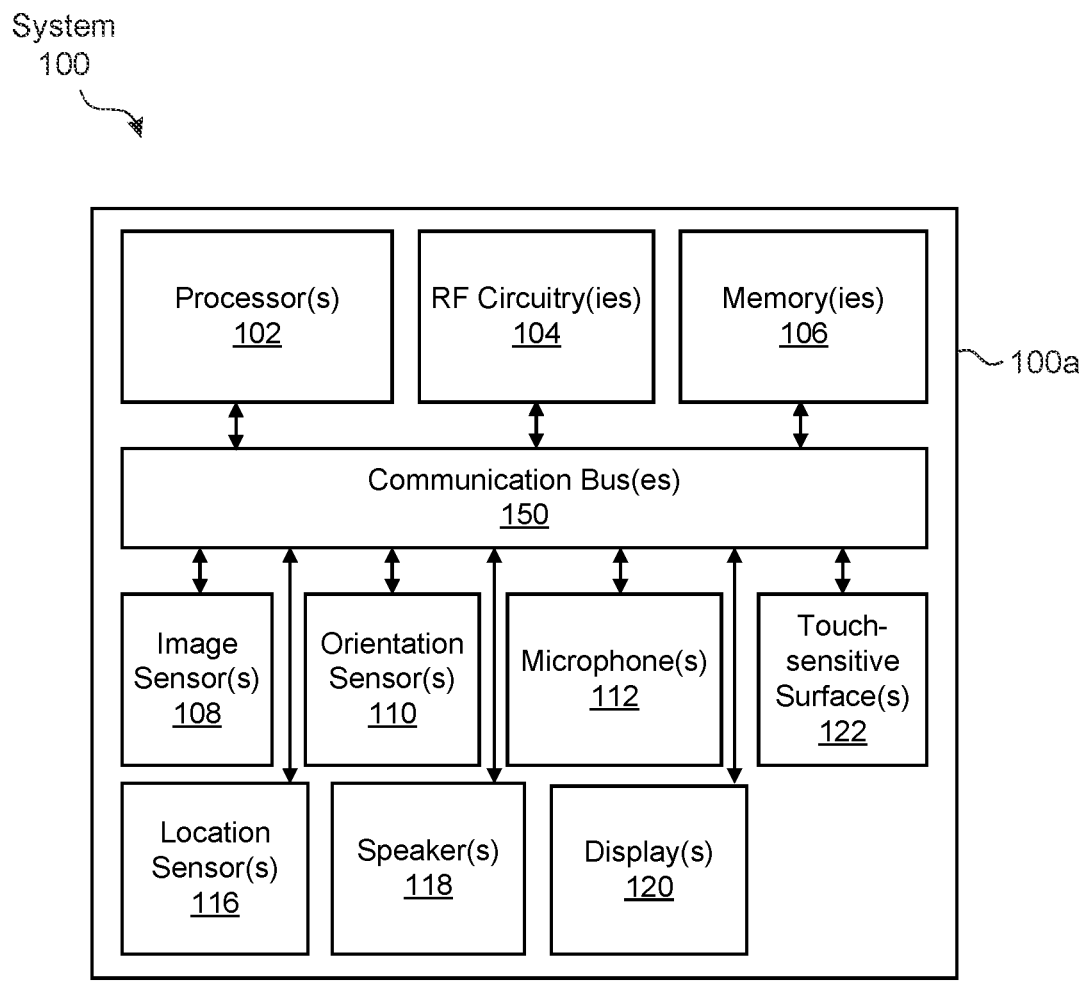
FIGS. 1A and 1B depict exemplary systems for use in various CGR technologies, including virtual reality and mixed reality.

The following description sets forth exemplary methods, parameters, and the like. It should be recognized, however, that such description is not intended as a limitation on the scope of the present disclosure but is instead provided as a description of exemplary embodiments.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
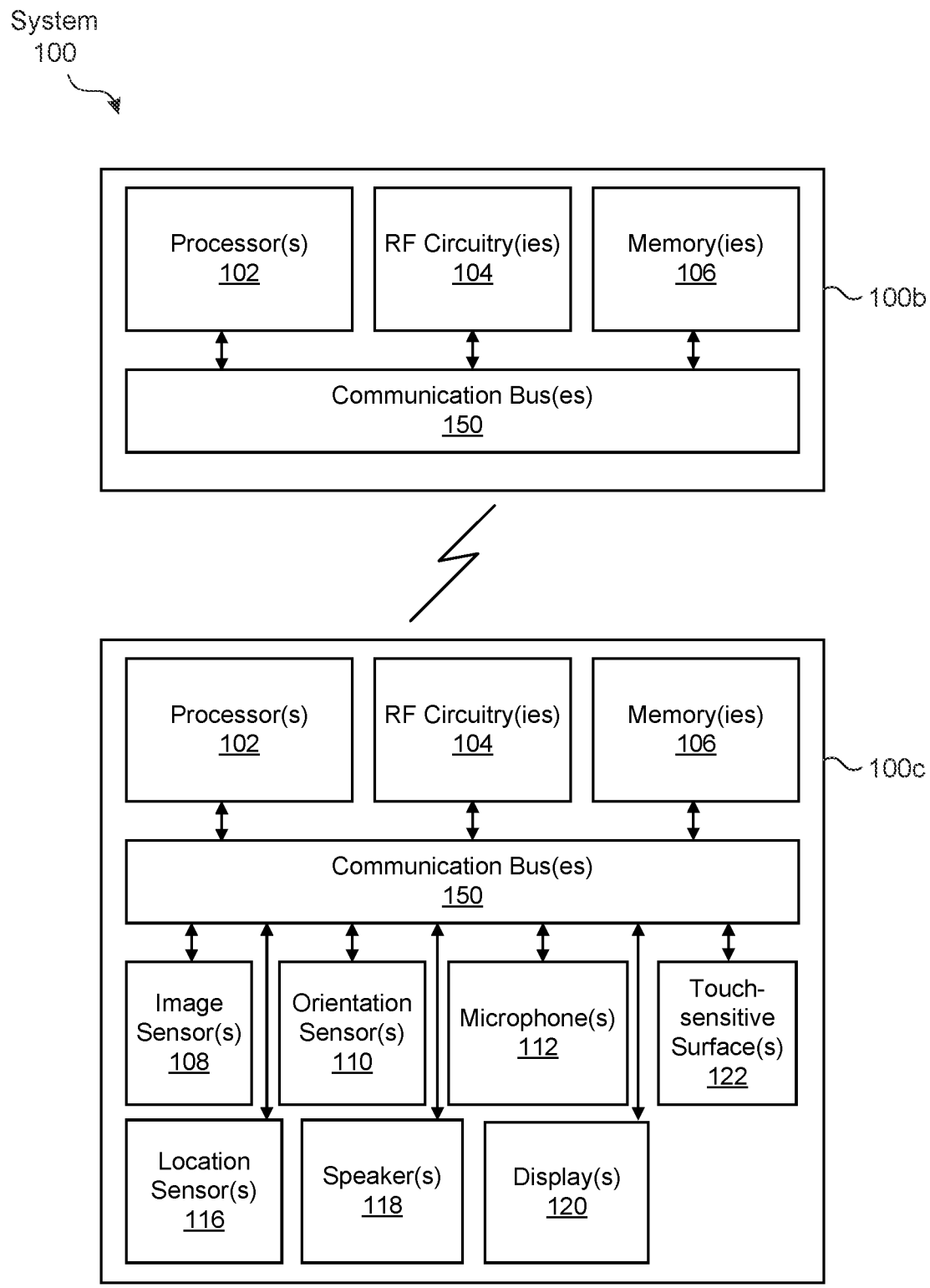

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some embodiments, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
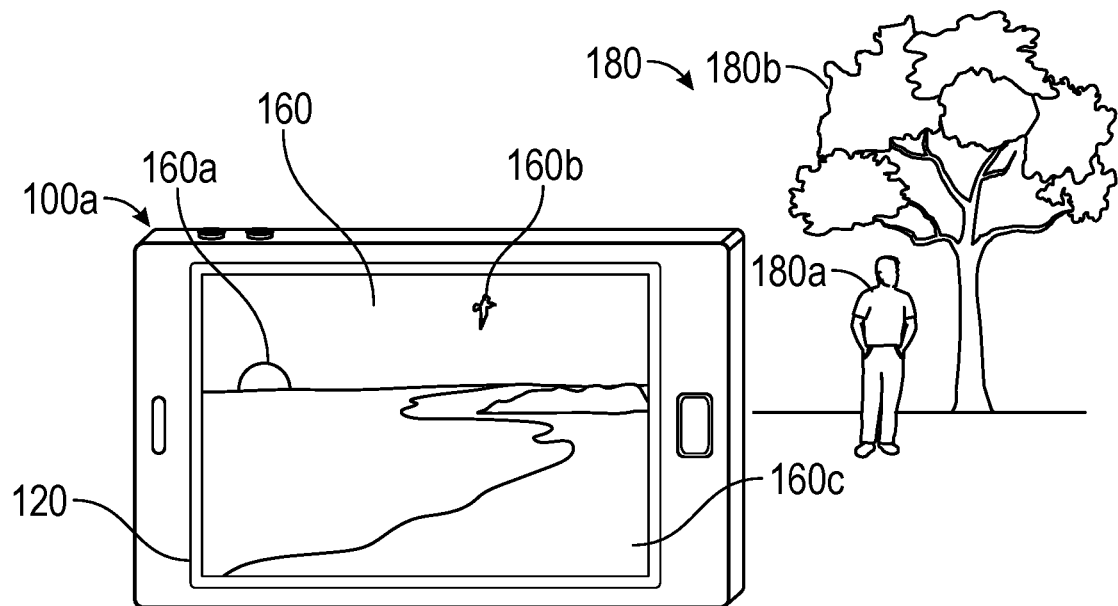
FIGS. 1C-1E illustrate embodiments of the system in the form of mobile devices.
Figure 1D:
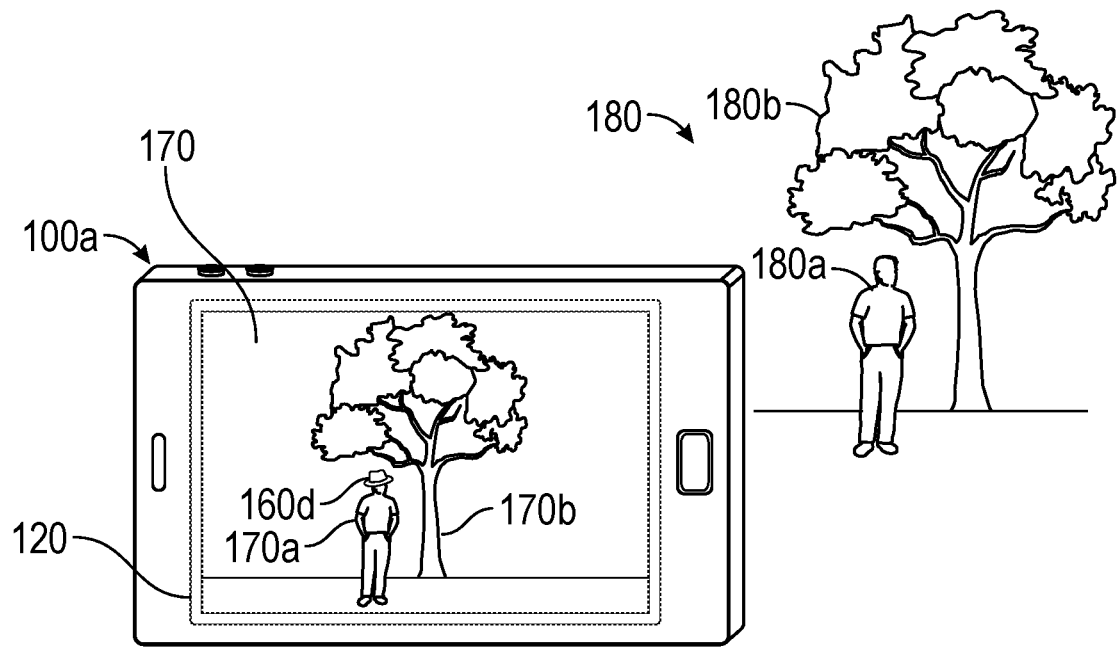
Figure 1E:
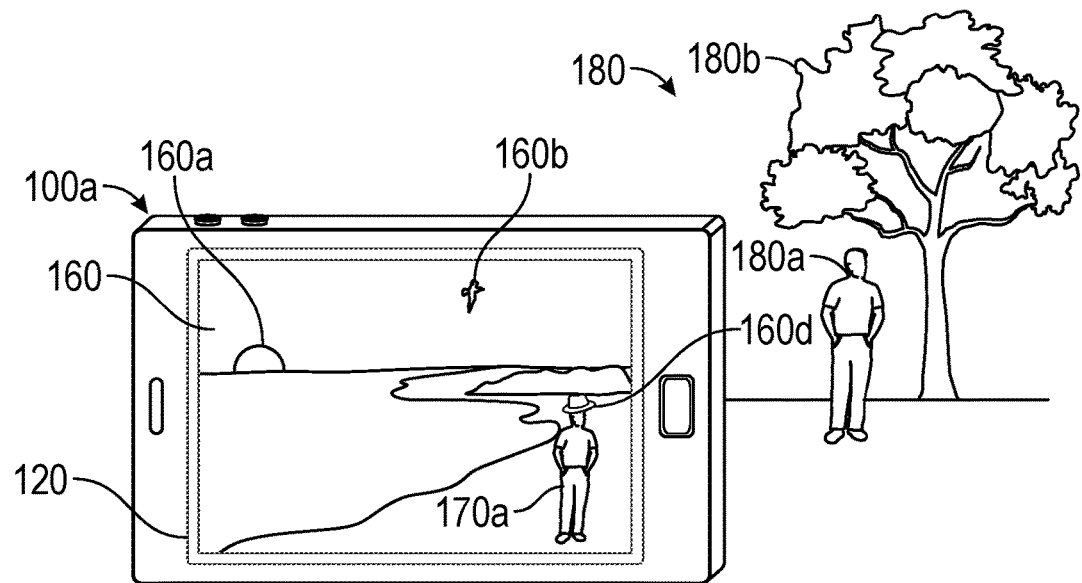

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. H.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate embodiments of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery. Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this embodiment, device 100a accounts for movements of device 100a and person 180a to display hat 160d as being on the head of the representation 170a of person 180a.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of representation 170a of person 180a. Notably, in this embodiment, device 100a does not display a representation of tree 180b even though tree 180b is also within the field of view of the image sensor(s) 108 of device 100a, in carrying out the mixed reality technique.

Figure 1F:
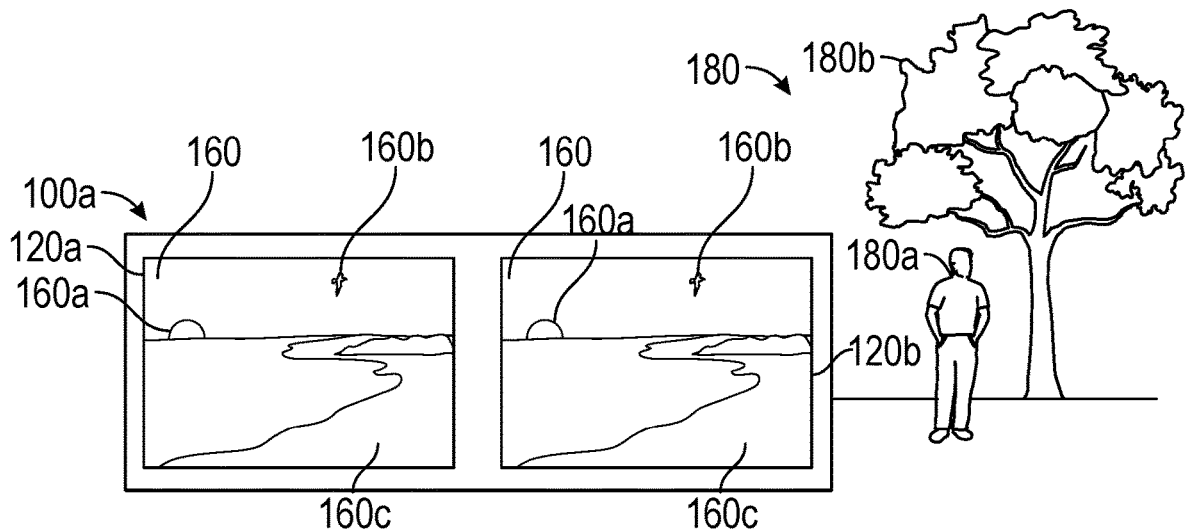
FIGS. 1F-1H illustrate embodiments of the system in the form of head mounted display (HMD) devices.
Figure 1G:
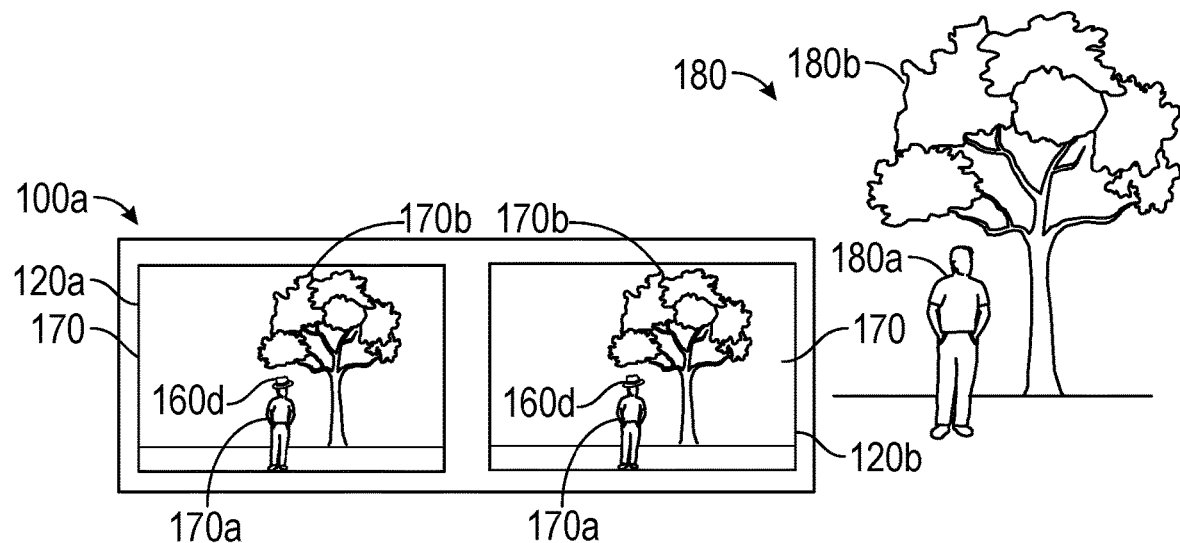
Figure 1H:
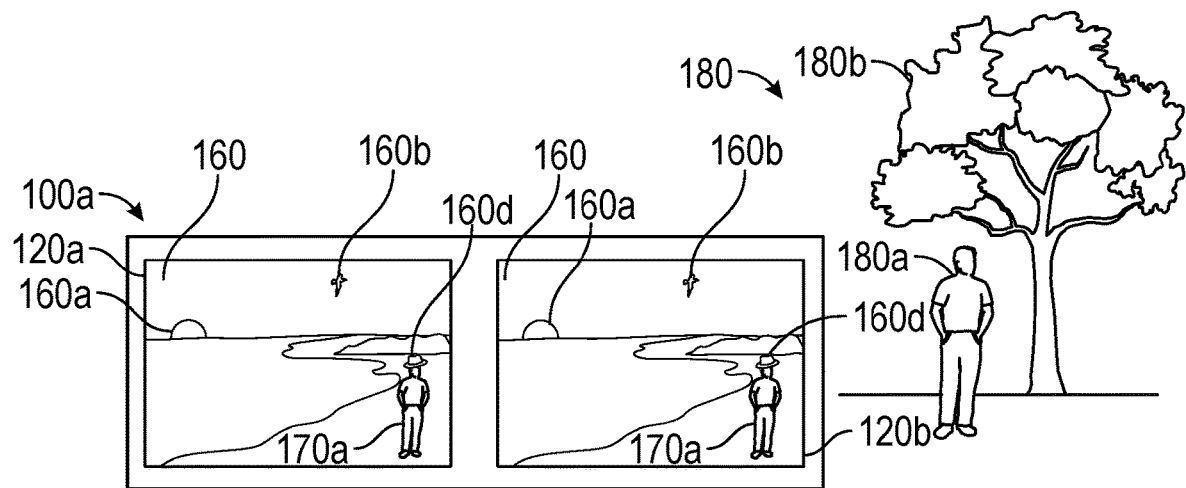

FIGS. 1F-1H illustrate embodiments of system 100 in the form of device 100a. In FIGS. 1F-1H, device 100a is a HMD device configured to be worn on the head of a user, with each eye of the user viewing a respective display 120a and 120b. FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this embodiment, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of the representation 170a of person 180a. Notably, in this embodiment, device 100a does not display a representation of tree 180b even though tree 180b is also within the field of view of the image sensor(s) 108 of device 100a, in carrying out the mixed reality technique.

Figure 1I:
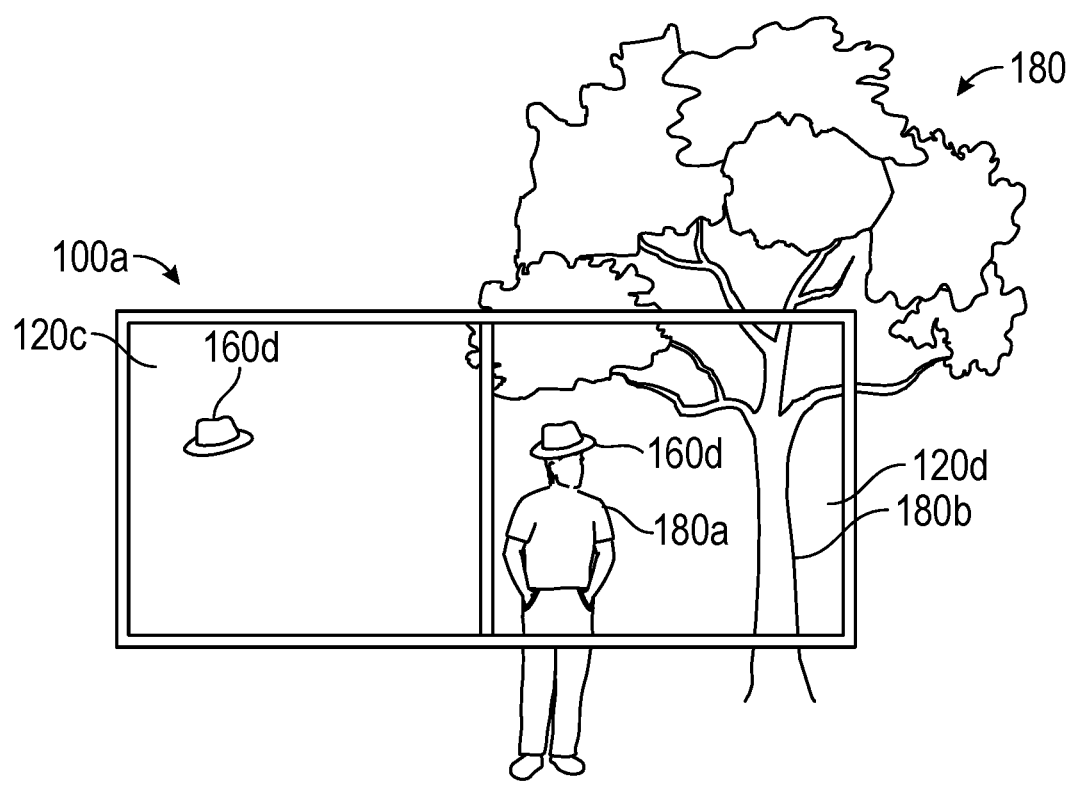
FIG. 1I illustrates an embodiment of the system in the form of a head-up display (HUD) device.

FIG. 1I illustrates an embodiment of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this embodiment, device 100a accounts for movements of device 100a, movements of the users eyes with respect to device 100a, and movements of person 180a to display hat 160d at locations on displays 120c and 120d such that it appears to the user that the hat 160d is on the head of person 180a.

With reference now to FIGS. 2-9, exemplary techniques for customizing an entrance or exit event in a CGR environment are described.

Figure 2:
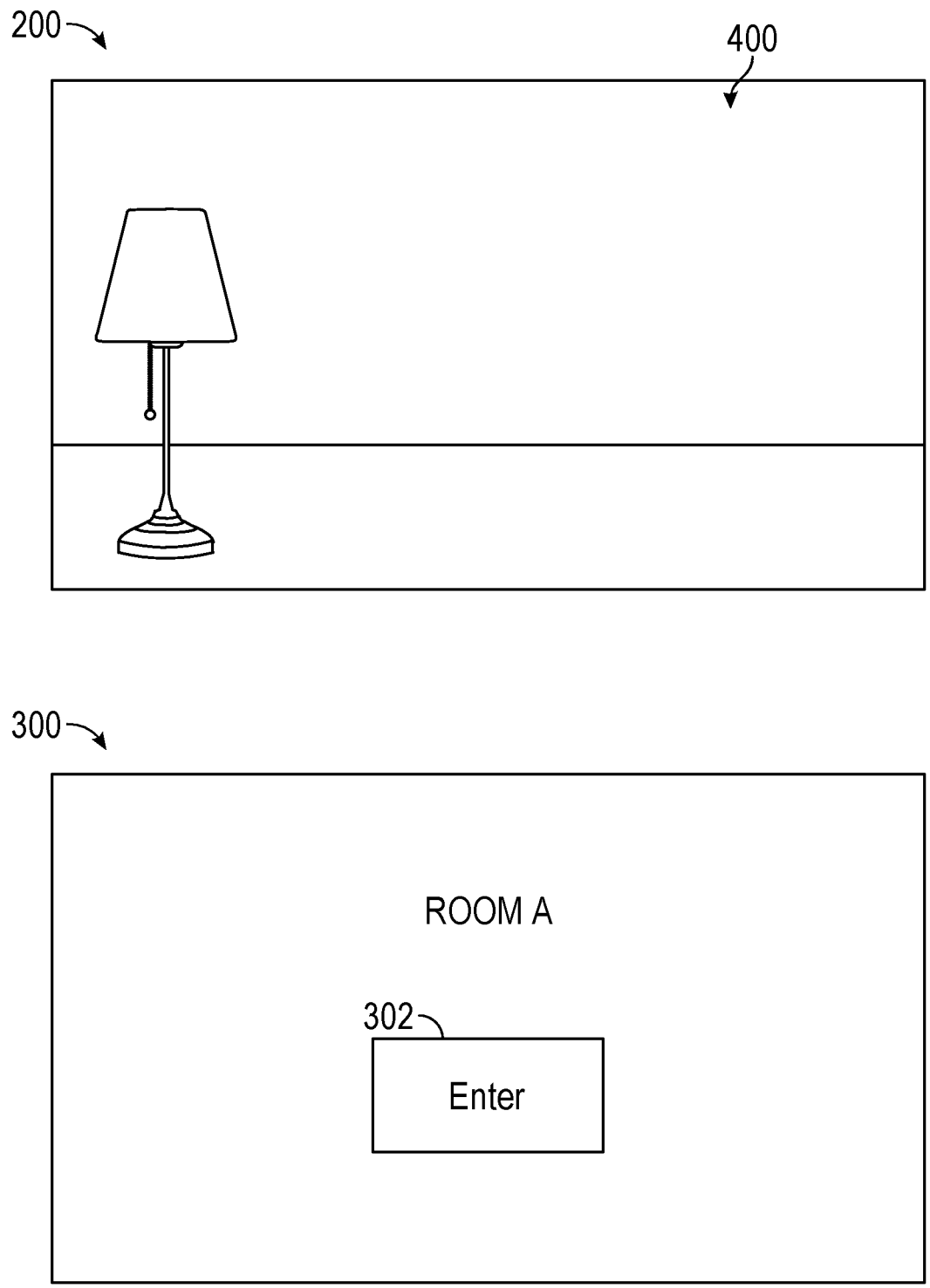
FIGS. 2-3 illustrate user interfaces for CGR, according to various embodiments.
Figure 5:
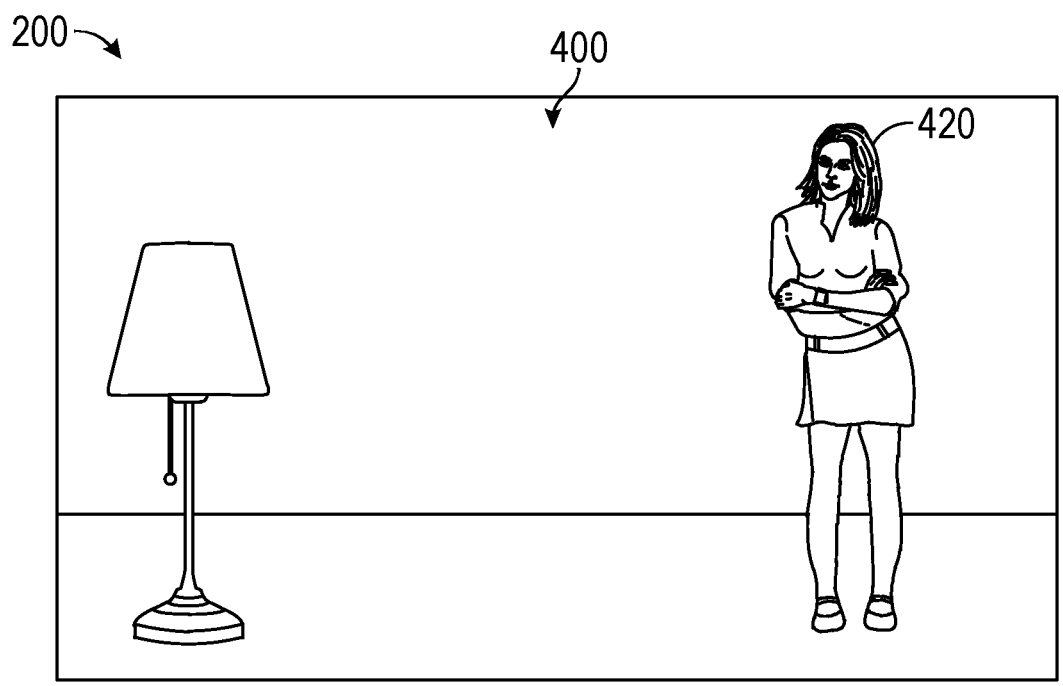
FIGS. 5-7 illustrate user interfaces for CGR, according to various embodiments.
Figure 5:
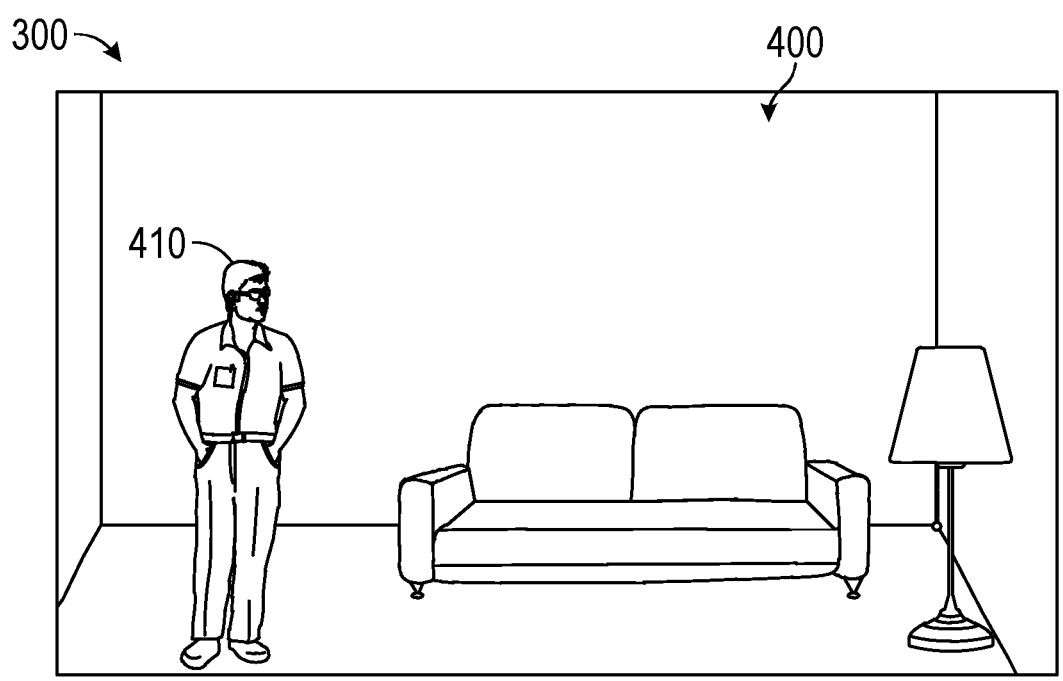
Figure 11:
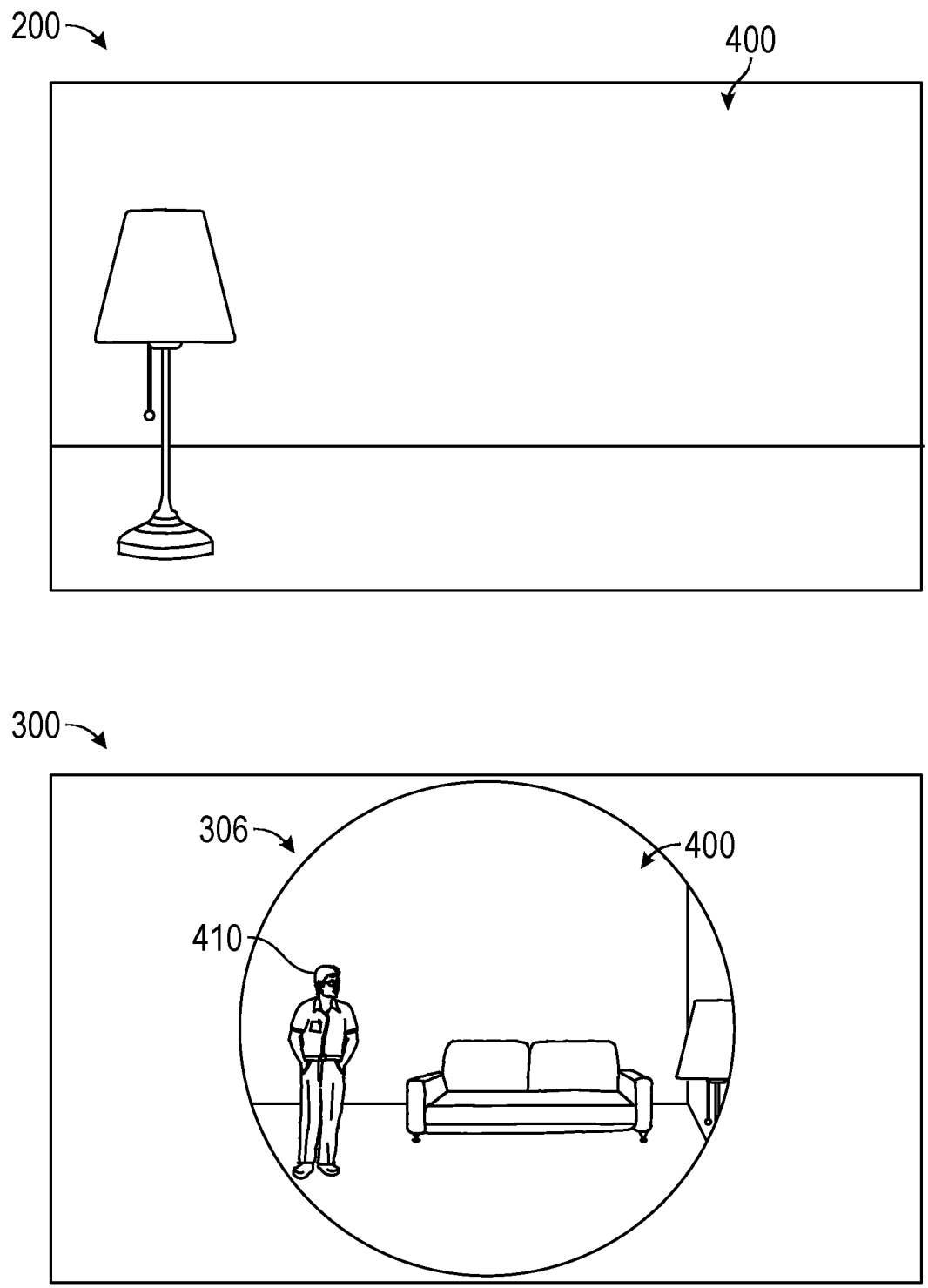

FIG. 2 depicts content displayed on two different devices, first device 200 associated with a first user, and second device 300 associated with a second user. Devices 200 and 300 are each configured to access and display a view of virtual environment 400. In some embodiments, environment 400 is a CGR environment (e.g., a VR or MR environment). In FIG. 2, the first user of device 200 is considered to be present in virtual environment 400, and is therefore provided a view from within virtual environment 400 on device 200. This view is taken from the perspective of avatar 410 associated with the first user. Avatar 410 is depicted in FIGS. 5 and 11. The second user has not entered the same virtual environment 400. As can be seen in FIG. 2, device 300 provides the second user with a graphical user interface menu having option 302 to enter virtual environment 400. In some embodiments, option 302 is an affordance that can be selected by the second user (e.g., via a hand gesture, controller input, voice input, or, if display 200 is touch-sensitive, a touch input on display 200).

Figure 3:
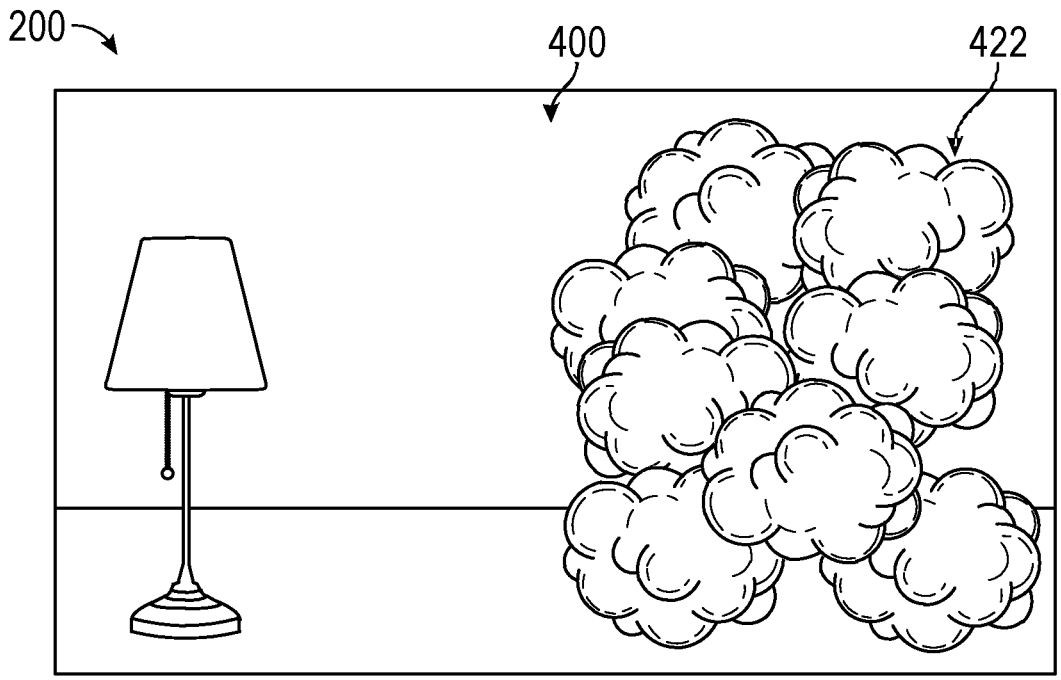
Figure 3:
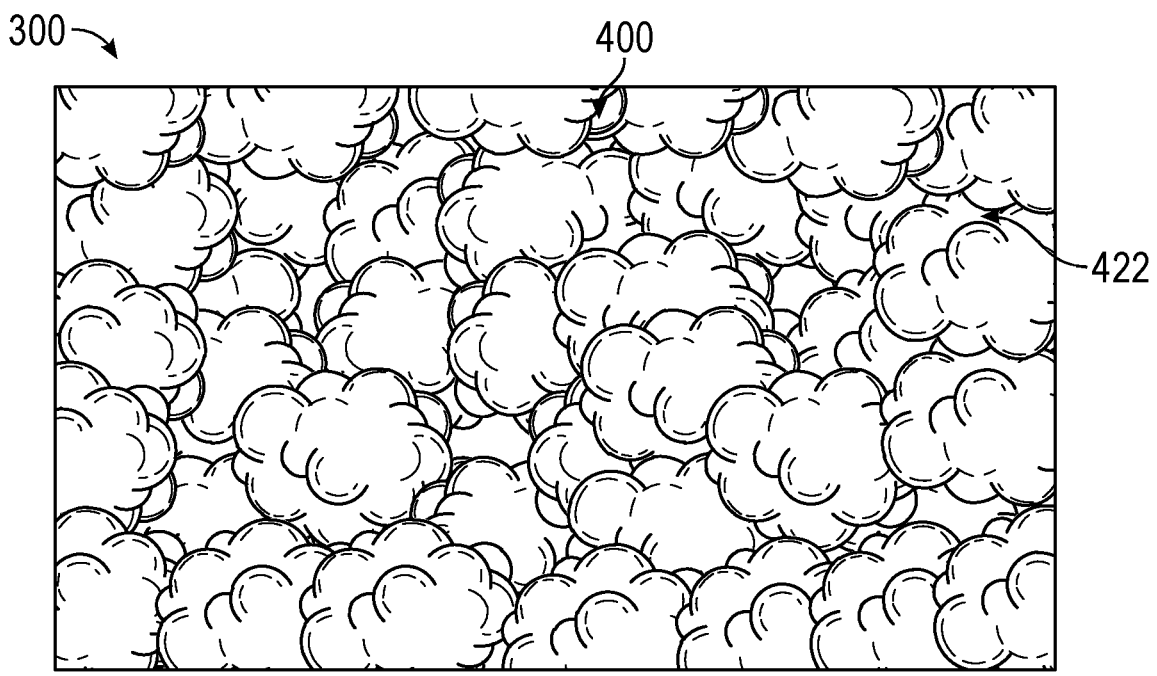
Figure 4:
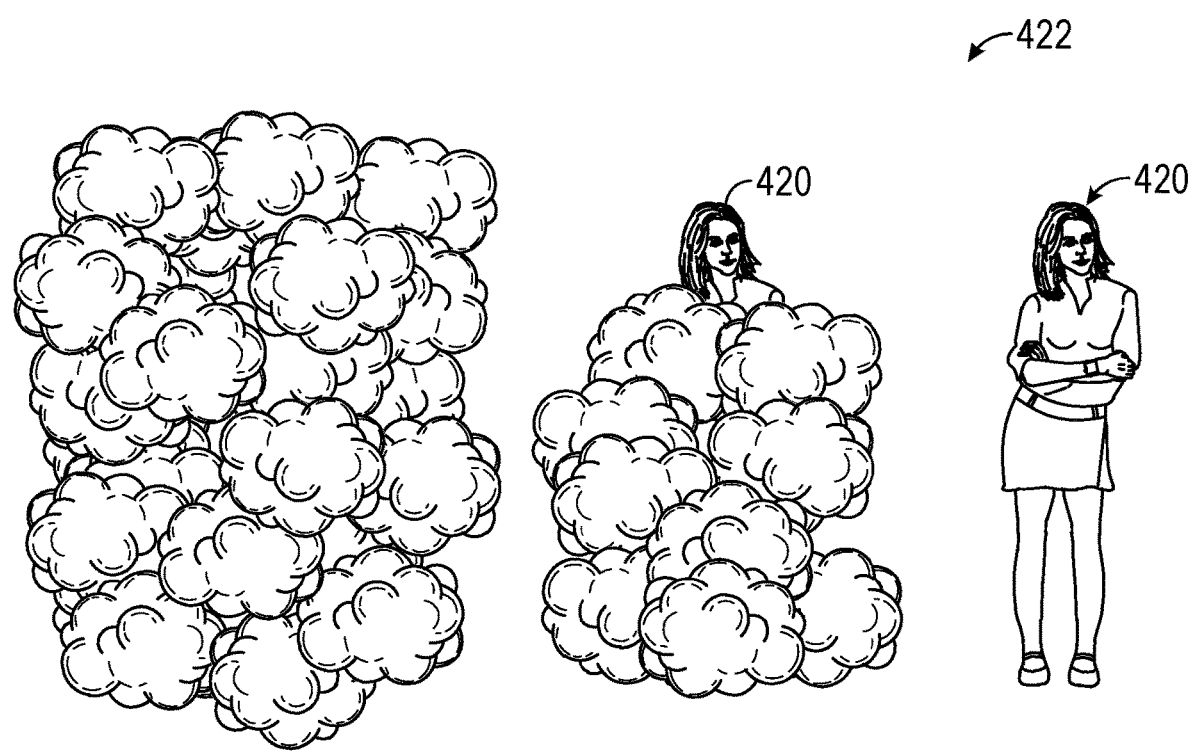
FIG. 4 illustrates an exemplary entrance effect for CGR.

FIG. 3 depicts an exemplary response to the second user entering virtual environment 400 (e.g., by selecting option 302). The response includes displaying a view of environment 400 on the second user's device 300. The response also includes an entrance effect that is associated with the second user, such as entrance effect 422. The entrance effect can include some combination of visual, audio, haptic, or other sensory effects or actions (e.g., visual effects, sound effects, haptic effects, a smell (e.g., produced by releasing a fragrance), or a breeze (e.g., produced by activating a fan)). The effects (or portions thereof) that are actually produced will depend on the capabilities and configuration of the producing device. In the embodiment illustrated in FIG. 3, entrance effect 422 associated with the second user includes a cloud of smoke from which avatar 420 representing the second user appears in virtual environment 400. Entrance effect 422 is depicted in greater detail in FIG. 4. FIG. 5 illustrates entrance effect 422 from the perspective of the first user, as shown on first device 200, and from the perspective of the second user, as shown on second device 300.

In some embodiments, the entrance effect associated with the second user entering virtual environment 400 is specified by the second user (e.g., via a graphical user interface on device 300). In this way, the second user can customize the effect presented on device 300 (e.g., the second user's own device) when the second user enters virtual environment 400. Entrance effect 422 also serves the purpose of drawing the first user's attention to the second user entering virtual environment 400. The embodiment depicted in FIG. 3 illustrates the ability for the second user to select the entrance effect presented on his own device as well as to specify an entrance effect the second user would like others to see, hear, feel, etc., when the second user enters the environment. In some embodiments, the entrance effect specified by the second user is obtained by the first device (e.g., as a default effect) to be provided upon the entrance of the second user. Examples of providing an entrance effect include producing a visual display, audio output, haptic output, or other output corresponding to the effect. In some embodiments, providing the entrance effect includes sending data representing the entrance effect to a device configured to produce output that generates the effect. In FIG. 3, the entrance effect 422 specified by the second user is displayed on first device 200 and second device 300, such that the first user and the second user see the same effect, but from different perspectives. In this way, the second user can specify effect 422 as the effect that the second user prefers other users in the virtual environment (e.g., the first user) to experience when the second user enters the virtual environment 400.

In some embodiments, the second user can define different entrance effects for different situations. Different entrance effects can be based on, for example, the virtual environment being entered, the time the entry occurs, the other user(s) that are already present in the environment, the context of the environment (e.g., a business meeting or a personal party), or other factors. In some embodiments, the second user can specify an entrance effect to be presented on the second user's own device 300 and a different entrance effect that is provided to other users (e.g., the first user) that are present in the virtual environment at the time the second user enters the environment. There are various ways in which an effect specified by the user entering the environment (e.g., the second user) can be obtained by the other users occupying the environment at the time the user enters the environment (or by the devices associated with the other users (e.g., device 200)). In some embodiments, the device associated with the entering user (e.g., device 300) transmits the entrance effect to the device(s) of other user(s), either directly (e.g., device to device) or indirectly (e.g., via a network or intermediary device, such as a server that hosts the virtual environment). In some embodiments, the entrance effect is obtained from a database or an account associated with the user entering the environment.

FIG. 5 illustrates the view of virtual environment 400 displayed on devices 200 and 300 after entrance effect 422 associated with the second user has completed. The first user sees avatar 420 representing the second user, thus indicating that the second user is present in virtual environment 400. The second user sees a view of virtual environment 400 from the perspective of the second user's avatar 420. For instance, from the perspective displayed on device 200, it can be seen that the lamp is in front and to the right of avatar 420 of the second user. The perspective is also from the left side of the second user's avatar 420. This is consistent with the perspective displayed to the second user on device 300, which shows the lamp on the right side of the view and avatar 410 of the first user on the left.

In some embodiments, the entrance effect is a transition effect that is presented upon occurrence of an entry event. The entrance effect optionally is a transitory effect of limited duration (e.g., 1-5 seconds). For example, the transition effect is distinct from persistent characteristics of the environment or the appearance of a user's avatar. In some embodiments, a user can also customize his or her avatar. Optionally, different avatars can be used based on, for example, the virtual environment, the time at which the virtual environment is occupied, the other user(s) that are in (or have access to) the virtual environment, the context of the virtual environment (e.g., a business meeting or a personal party), or other factors.

Figure 6:
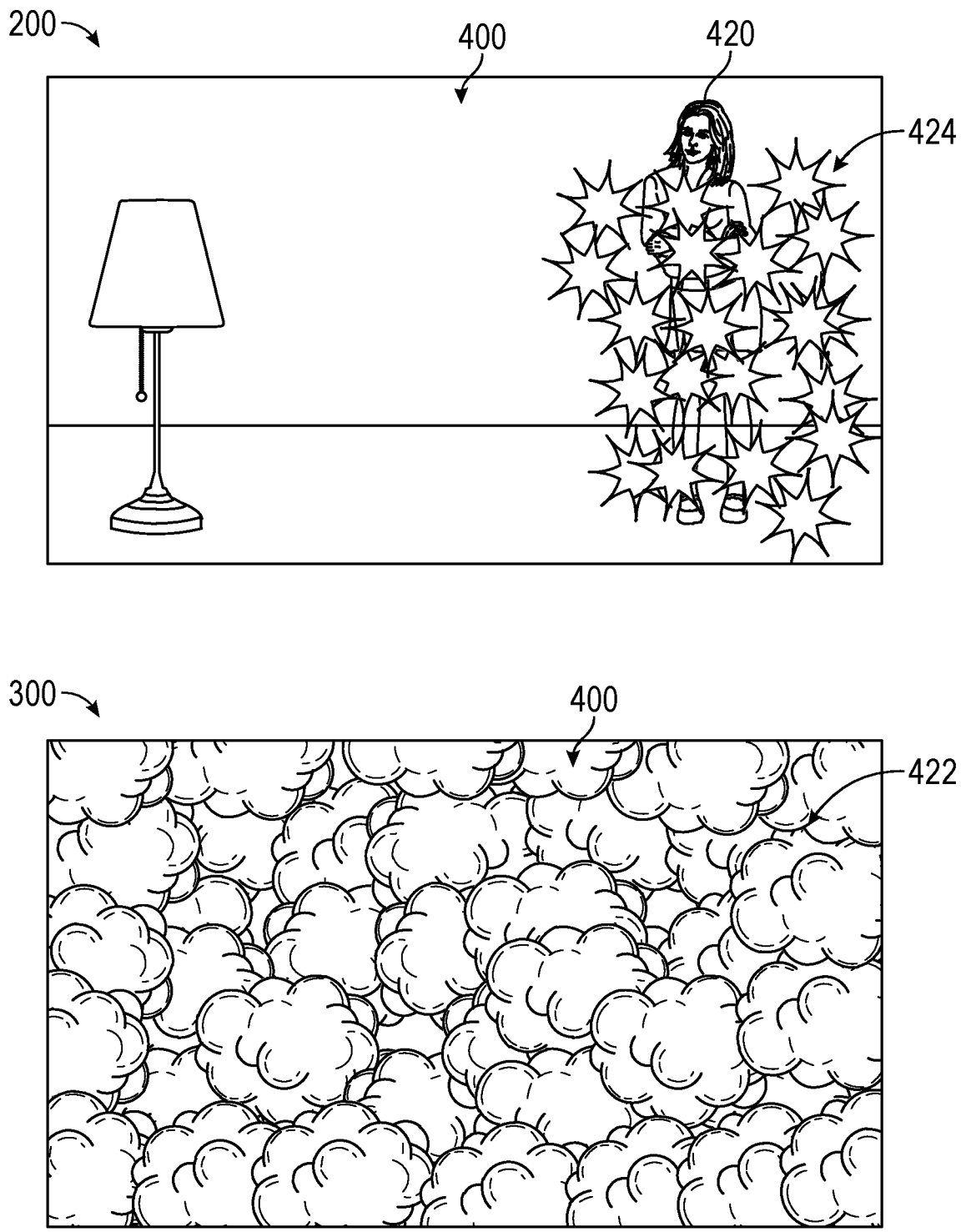

Turning now to FIG. 6, a technique for a user to designate an entrance effect to be provided on the user's own device when another user enters the environment is described. That is to say, even if the second user specifies entrance effect 422 to be the entrance effect that should be shown on other users' devices in virtual reality, the first user can override that entrance effect with a different effect such that the first user's device (e.g., 200) provides the entrance effect designated by the first user whenever the second user enter into the same virtual environment with the first user. And conversely, the second user can override an entrance effect specified by the first user that is to be shown on the second user's device (e.g., 300).

For example, similar to the embodiment depicted in FIG. 3, the second user has selected smoke effect 422, which is displayed on second device 300 when the second user enters the environment 400. In the embodiment depicted in FIG. 6, however, the first user has designated a different entrance effect 424 for the second user. In the illustrated embodiment, the first user has designated a sparkle effect, such that avatar 420 representing the second user is temporarily surrounded by sparkles when entering environment 400. In some embodiments, upon receiving an indication that the second user is going to enter environment 400, first device 200 determines whether the first user has designated an entrance effect for the second user. If the first user has not designated an entrance effect for the second user, first device 200 obtains and provides an entrance effect associated with the second user (e.g., a default effect or an effect specified by the second user, such as entrance effect 422). If the first user has designated an entrance effect for the second user (as in the embodiment depicted in FIG. 6), first device 200 provides the designated effect (e.g., entrance effect 424). In this way, the first user overrides the entrance effect specified by the second user. Optionally, the first user can designate different entrance effects to be provided on device 200 when different users enter the environment, or for different environments, contexts, etc., analogously to the way that the second user can specify different entrance effects to be associated with himself, as described above.

Optionally, prior to producing either the obtained effect (e.g., the effect specified by the second user) or the designated effect (e.g., the effect designated by the first user), a determination is made as to whether first device 200 is configured to provide the effect (e.g., the effect includes a three dimensional effect or a haptic output, but first device 200 does not include three-dimensional capability or a haptic output device). If it is determined that first device 200 cannot provide the effect, first device 200 provides a different effect (e.g., an effect without the three-dimensional effect and the haptic output, or a default effect).

In some embodiments, even if the first user has designated an effect for the entrance of the second user (e.g., sparkle effect 424), an effect other than that designated by the first user is obtained (e.g., smoke effect 422 specified by the second user is obtained). In some examples of such embodiments, device 200 provides at least a portion of both the effect designated by the first user (e.g., effect 424) and the obtained effect (e.g., effect 422). For example, the first device 200 may produce audio effects obtained from the effect specified by the second user but produce a visual effect designated by the first user.

It can be understood from the embodiments described above that each user is provided with the user's own chosen effect(s), thus allowing a user to control and customize the user's own environment. This makes the environment more personal, entertaining, and enjoyable. In some embodiments, the effect that the first user designates for an entrance of the second user is private to the first user in the sense that it is not revealed to the second user (e.g., not produced on second device 300). Accordingly, the first user can customize his own environment based on personal preferences without being concerned about what the second user (or other users) may think about the effect that the first user has chosen. Another advantage of the disclosed techniques is that the first user can prevent undesired effects from being produced at device 200. By allowing the first user to maintain control over the effects that are produced by first device 200, the first user can prevent potentially inappropriate content or effects which the first user personally finds offensive.

Figure 7:
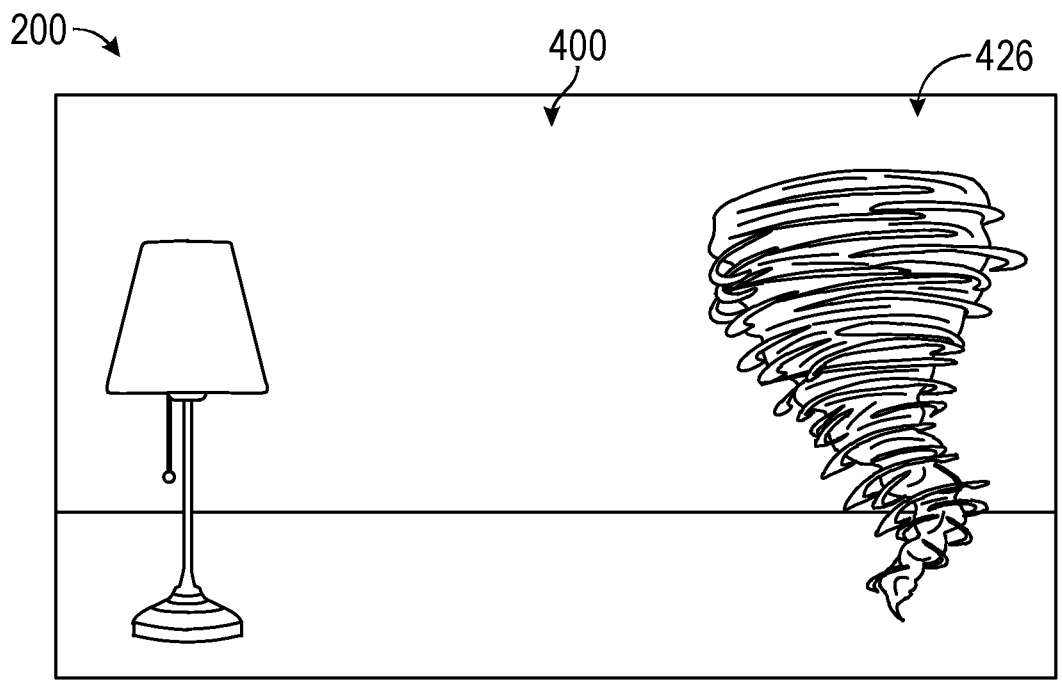
Figure 7:
Figure 8:
FIG. 8 illustrates an exemplary exit effect for CGR.
Figure 9:
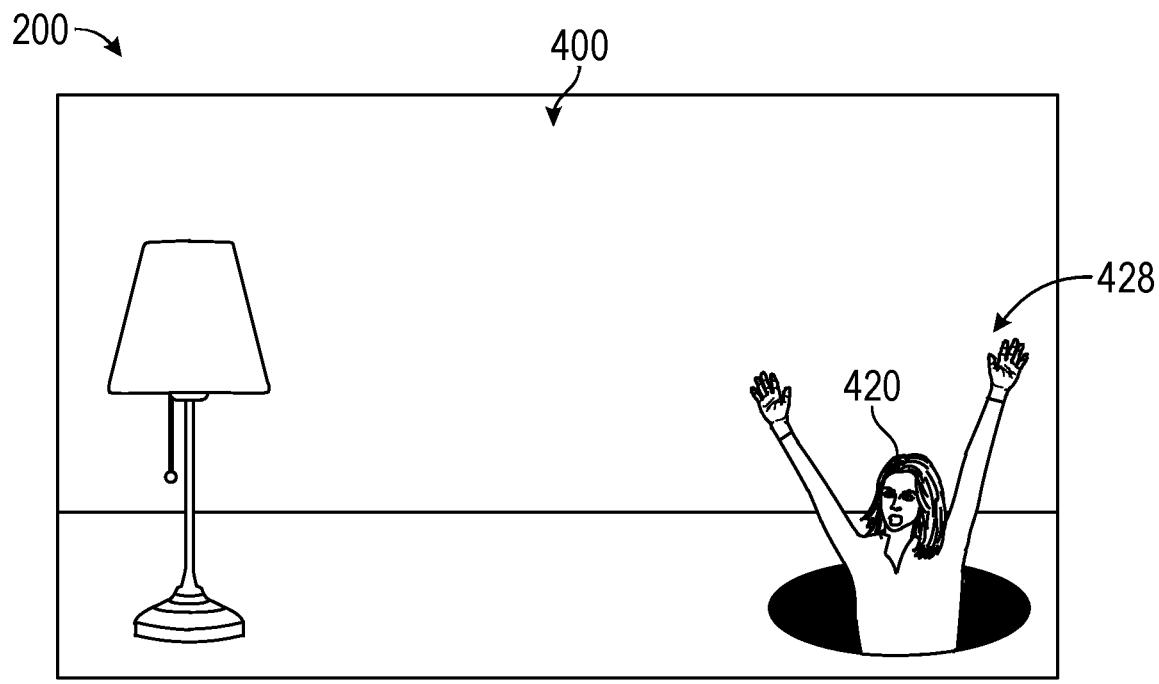
FIGS. 9-11 illustrate user interfaces for CGR, according to various embodiments.
Figure 9:
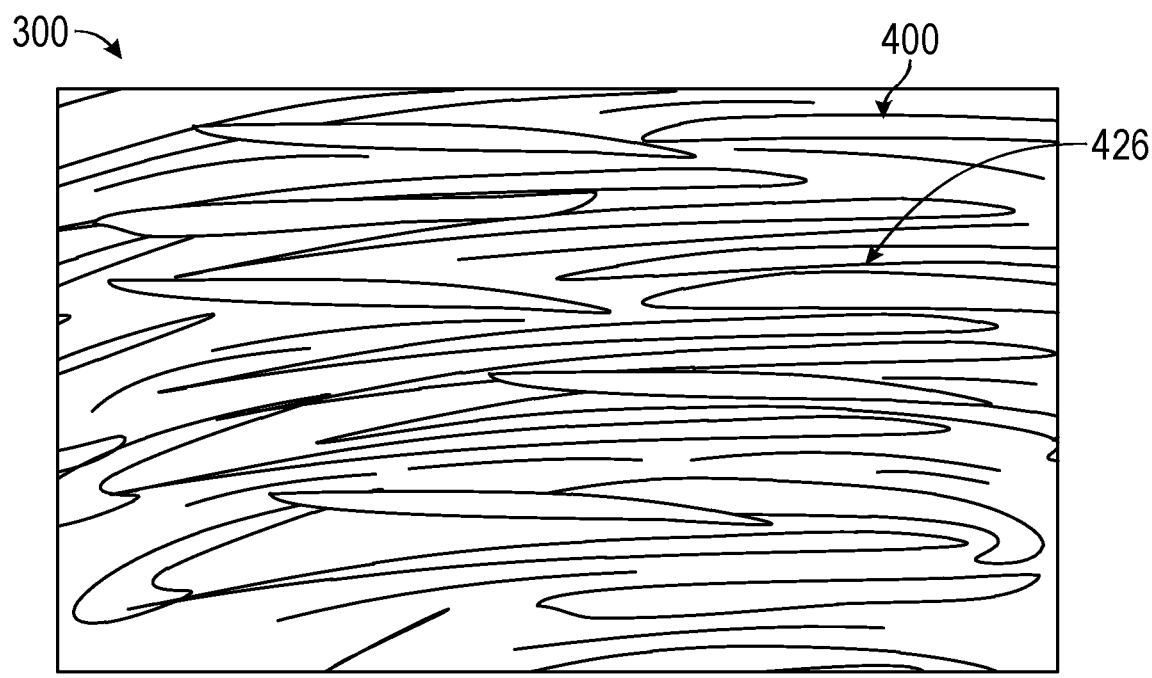

Turning now to FIG. 7, techniques analogous to the entrance effects discussed above are described as applied to a user exiting the virtual environment. FIG. 7 illustrates exemplary exit effect 426 associated with the second user. When the second user exits environment 400, the second user's avatar 420 disappears or is swept away in a vortex, illustrated in greater detail in FIG. 8. In the illustrated embodiment, the vortex effect 426 is specified by the second user, and the first user has not designated a different effect for the exit of the second user. Accordingly, both device 200 and device 300 produce the visual, audio, or other effects associated with the vortex effect 426, from the perspective of the first user and the second user, respectively. FIG. 9 illustrates an example in which the first user has designated a different exit effect associated with the second user. Specifically, the first user designates effect 428 in which avatar 420 of the second user drops through a hole in the floor. Accordingly, first device 200 provides exit effect 428 designated by the first user, while second device 300 provides vortex exit effect 426 specified by the second user, from the perspectives of the first and second users, respectively. Similarly, the first user can select an exit effect to be provided when the first user exits virtual environment 400, and the second user can designate an exit effect to be displayed on the second user's device that is different than the one specified by the first user. It should be recognized that the various features and characteristics of entrance effects described above can also be applied to exit effects. Applying the described techniques to exit effects thus provides for additional personalization of the user's environment and for the various advantages described above with respect to the entrance effect.

Figure 10:
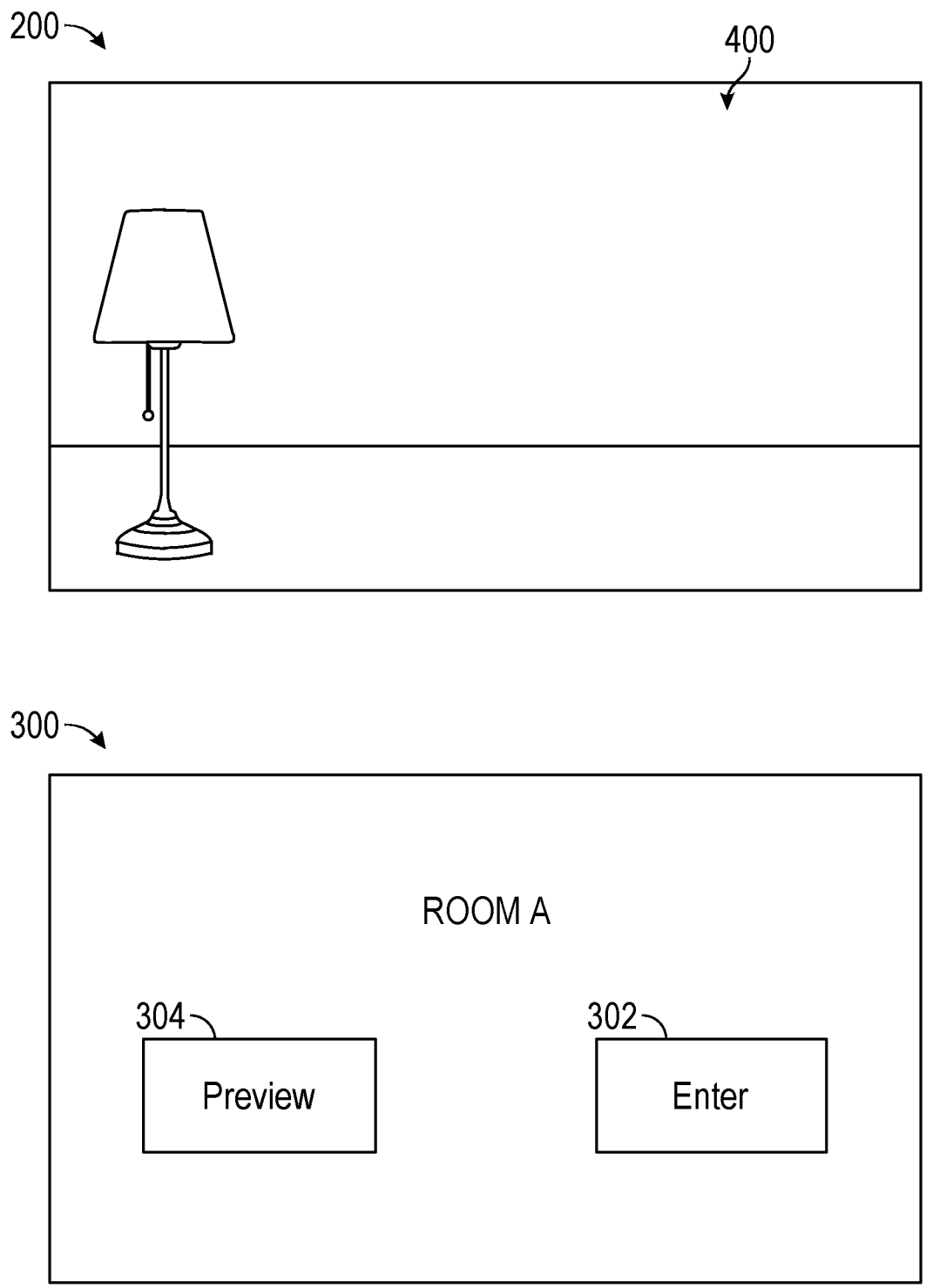

Turning now to FIGS. 10 and 11, techniques for previewing a virtual environment are described. Similar to FIG. 2, FIG. 10 depicts an embodiment in which content displayed on first device 200 and second device 300 indicates that the first user of device 200 is present in virtual environment 400 and that the second user has not entered the same virtual environment 400. Unlike FIG. 2, however, the graphical user interface menu on device 300 provides the second user with option 304 (e.g., an affordance) to preview virtual environment 400 in addition to option 302 to enter virtual environment 400.

FIG. 11 depicts an exemplary preview 306 of virtual environment 400 provided to the second user by device 300 in response to an indication that option 304 to preview the environment has been selected. In the embodiment illustrated in FIG. 11, preview 306 includes a limited view of virtual environment 400 (e.g., as if viewing virtual environment 400 through a port hole). In particular, preview 306 includes avatar 410 representing the first user, which indicates to the second user that the first user is present in virtual environment 400.

As described above, in some embodiments, an entrance effect is associated with a user who is previewing a virtual environment. For example, in the embodiments described above, entrance effects 422 and 424 are associated with the second user, who is previewing virtual environment 400 in FIG. 11. In some embodiments, however, the user previewing a virtual environment can elect not to have an associated entrance effect provided when previewing a virtual environment. In FIG. 11, for example, unlike when the second user enters virtual environment 400 as described above with respect to FIG. 3 and FIG. 6, the view of virtual environment 400 displayed on first device 200 remains unchanged. In particular, the first user is provided no indication that the second user is previewing virtual environment 400. That is, when the second user previews virtual environment 400, first device 200 refrains from displaying the entrance effect associated with the second user. In some embodiments, an indication (e.g., a visible or audible indication, other than an entrance effect associated with the previewing user) is provided by device 200 to notify the first user that someone is previewing virtual environment 400. The indication may or may not provide information that specifically identifies the user or device that is previewing the environment (e.g., the second user or device 300). Other variations of a preview are possible. For example, in some embodiments, the preview includes a display of a list of the users currently present in the environment (e.g., the first user). In some embodiments, option 304 to preview environment 400 includes a representation (e.g., a thumbnail image) of preview 306.

It should be recognized that the embodiments discussed above with respect to FIGS. 2-11 are exemplary and are not intended to be limiting. For example, although the embodiments in FIGS. 2-11 are described with respect to a virtual environment, the techniques can be applied analogously to other CGR environments, including mixed reality environments.

Figure 12:
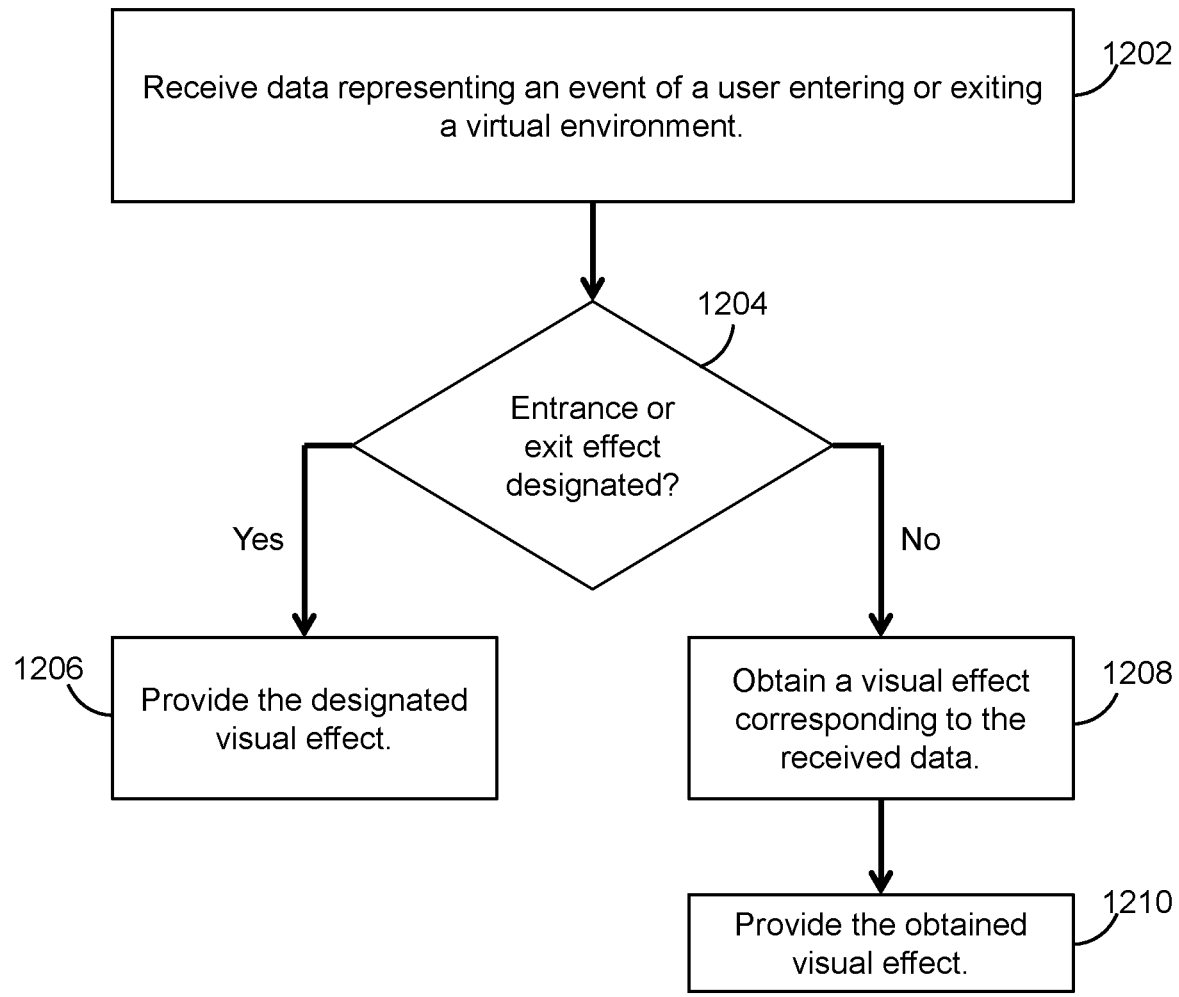
FIG. 12 depicts a flow chart of an exemplary process for a CGR environment, according to various embodiments.

Turning now to FIG. 12, a flow chart of exemplary process 1200 for customizing an entrance or exit event in a CGR environment is depicted. Process 1200 can be performed using a user device (e.g., 100*a*, 200, or 300). The user device is, for example, a handheld mobile device, a head-mounted device, or a head-up device. It should be recognized that, in other embodiments, process 1200 is performed using two or more electronic devices, such as a user device that is communicatively coupled to another device, such as a base device. In these embodiments, the operations of process 1200 are distributed in any manner between the user device and the other device. Further, it should be appreciated that the display of the user device can be transparent or opaque. It should also be appreciated that process 1200 can be applied to CGR environments, including virtual reality and mixed reality environments, and to effects that include visible features as well as non-visible features, such as audio, haptic, or the like. Although the blocks of process 1200 are depicted in a particular order in FIG. 12, it should be appreciated that these blocks can be performed in other orders. Further, one or more blocks of process 1200 can be optional and/or additional blocks can be performed.

At block 1202, data representing an event of a user entering or exiting a virtual environment (e.g., 400) is received. In some embodiments, the environment is a CGR environment (e.g., a VR or MR environment). At block 1204, in response to receiving the data representing the event, a determination is made as to whether a visual effect (e.g., 424 or 428) has been designated for the event of the user entering or exiting the virtual environment. In accordance with a determination that a visual effect (e.g., 424 or 428) has been designated for the user, the designated visual effect (e.g., 424 or 428) is provided at block 1206. In some embodiments, the designated visual effect is designated in the device providing the designated visual effect or in a database or account associated with the device providing the designated visual effect. In some embodiments, the designated visual effect (e.g., 424) is provided concurrently with a user avatar (e.g., 420) entering the virtual environment. Optionally, an output (e.g., visual, audible, or haptic) indicating a position at which the user avatar will enter the virtual environment is provided before the user avatar enters the virtual environment. In some embodiments, the designated visual effect (e.g., 428) is provided concurrently with a user avatar (e.g., 420) exiting the virtual environment.

In accordance with a determination that a visual effect has not been designated for the user, a visual effect (e.g., 422 or 426) corresponding to the received data is obtained at block 1208, and the obtained visual effect (e.g., 422 or 426) is provided at block 1210. In some embodiments, the obtained visual effect is obtained from the received data. In some embodiments, the obtained visual effect is provided concurrently with a user avatar (e.g., 420) entering the virtual environment. In some embodiments, the obtained visual effect (e.g., 426) is provided concurrently with a user avatar (e.g., 420) exiting the virtual environment. Optionally, if a user avatar is currently displayed in the virtual environment, the user avatar is caused to cease being displayed in the virtual environment in response to receiving data representing an exit event.

Optionally, further in accordance with a determination that a visual effect has been designated for the user, a second visual effect (e.g., 422 or 426) corresponding to the received data is obtained and at least a portion of the second effect (e.g., 422 or 426) is provided (e.g., to provide a combination of the designated effect and the obtained effect). In some embodiments, the visual effect (e.g., the obtained visual effect or the designated visual effect) is provided in accordance with a device providing the visual effect being configured to provide the visual effect. Optionally, in accordance with the device not being configured to provide the designated visual effect or the obtained visual effect, a visual effect other than the designated visual effect or the obtained visual effect, respectively, is provided (e.g., only a portion of the obtained and/or designated effect that the device is configured to provide).

Figure 13:
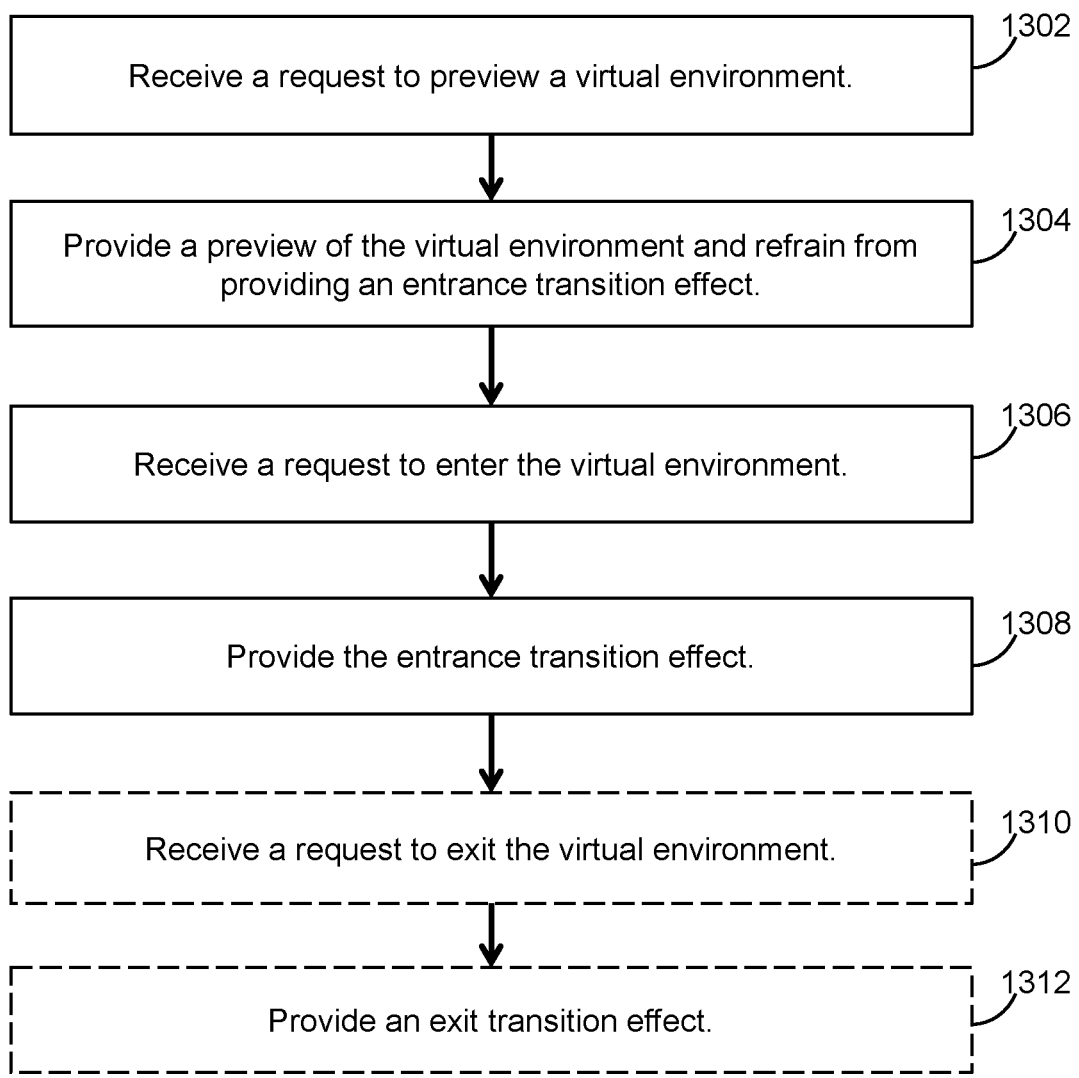
FIG. 13 depicts a flow chart of an exemplary process for a CGR environment, according to various embodiments.

Turning now to FIG. 13, a flow chart of exemplary process 1300 for customizing an entrance or exit event in a CGR environment is depicted. Process 1300 can be performed using a user device (e.g., 100*a*, 200, or 300). The user device is, for example, a handheld mobile device, a head-mounted device, or a head-up device. It should be recognized that, in other embodiments, process 1300 is performed using two or more electronic devices, such as a user device that is communicatively coupled to another device, such as a base device. In these embodiments, the operations of process 1300 are distributed in any manner between the user device and the other device. Further, it should be appreciated that the display of the user device can be transparent or opaque. It should also be appreciated that process 1300 can be applied to CGR environments, including virtual reality and mixed reality environments, and to effects that include visible features as well as non-visible features, such as audio, haptic, or the like. Although the blocks of process 1300 are depicted in a particular order in FIG. 13, it should be appreciated that these blocks can be performed in other orders. Further, one or more blocks of process 1300 can be optional and/or additional blocks can be performed. For example, some operations in method 1200 (e.g., block 1206, described above) are, optionally, included in method 1300, and some operations in method 1300 (e.g., block 1304, described below) are, optionally, included in method 1200.

At block 1302, a request (e.g., a user input selection option 304 or data representing a request) to preview a virtual environment (e.g., 400) is received. In some embodiments, the environment is a CGR environment (e.g., a VR or MR environment). In some embodiments, the virtual environment is a first virtual environment (e.g., a virtual room) included in a second virtual environment (e.g., a virtual house or office building). At block 1304, in response to receiving the request to preview the virtual environment, a preview (e.g., 306) of the virtual environment is provided (e.g., produced, displayed, or transmitted via data representing the preview). When the preview is provided, an entrance transition effect (e.g., 422) is not provided and, optionally, an avatar (e.g., 420) is not caused to be displayed in the virtual environment.

At block 1306, a request (e.g., a user input selecting option 302 or data representing a request) to enter the virtual environment is received. At block 1308, in response to receiving the request to enter the virtual environment, the entrance transition effect (e.g., 422) is provided (e.g., produced, displayed, or transmitted via data representing the effect). Optionally, the virtual environment (or a representation of the virtual environment) is caused to be displayed in response to receiving the request to enter the virtual environment. An avatar (e.g., 420) is optionally caused to be displayed in the virtual environment in response to receiving the request to enter the virtual environment. In some embodiments, the entrance transition effect is a default effect. In some embodiments, the entrance transition effect is selected by a user. The entrance transition effect is, optionally, associated with a specific user (e.g., in a database or a user account of the user).

At block 1310, a request (e.g., a user input or data representing a request) to exit the virtual environment is optionally received, and at block 1312 an exit transition effect (e.g., 426) is optionally provided (e.g., produced, displayed, or transmitted via data representing the effect) in response to receiving the request to exit the virtual environment. Optionally, the user avatar (e.g., 420) is caused to cease being displayed in response to receiving the request to exit the virtual environment. In some embodiments, the exit transition effect is a default effect. In some embodiments, the exit transition effect is selected by a user. The exit transition effect is, optionally, associated with a specific user (e.g., in a database or a user account of the user).

Executable instructions for performing the features of methods 1200 and/or 1300 described above are, optionally, included in a transitory or non-transitory computer-readable storage medium (e.g., memory(ies) 106) or other computer program product configured for execution by one or more processors (e.g., processor(s) 102).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   one or more processors; and
   memory storing one or more programs configured to be executed by the one or more processors, the one or more programs including instructions for:
   receiving an input;
   in accordance with a determination that the received input corresponds to a request to preview a virtual environment:
   providing a preview of the virtual environment; and
   refraining from providing an entrance transition effect; and
   in accordance with a determination that the received input corresponds to a request to enter the virtual environment:
   causing a display of an avatar in the virtual environment; and
   providing the entrance transition effect, wherein while the entrance transition effect provided at the electronic device includes a transitory visual effect that is distinct from an appearance of the avatar and is provided with the avatar for a predetermined period of time, a second entrance transition effect different from the entrance transition effect is provided at a second electronic device different from the electronic device.

2. The electronic device of claim 1, the one or more programs further including instructions for:
   further in accordance with a determination that the received input corresponds to the request to enter the virtual environment, causing a display of the virtual environment.

3. The electronic device of claim 1, the one or more programs further including instructions for:
   further in accordance with a determination that the received input corresponds to the request to preview the virtual environment, refraining from causing a display of the avatar in the virtual environment.

4. The electronic device of claim 1, wherein the entrance transition effect is a default effect or an effect associated with a specific user.

5. The electronic device of claim 1, the one or more programs further including instructions for:
   receiving a request to exit the virtual environment; and
   in response to receiving the request to exit the virtual environment, providing an exit transition effect.

6. The electronic device of claim 5, wherein the exit transition effect is a default effect, an effect selected by a user, or an effect associated with a specific user.

7. The electronic device of claim 1, wherein the virtual environment is a first virtual environment included in a second virtual environment.

8. The electronic device of claim 1, wherein the entrance transition effect is an effect selected by a user.

9. A non-transitory computer-readable storage medium storing one or more programs configured to be executed by one or more processors of an electronic device, the one or more programs including instructions for:
   receiving an input;
   in accordance with a determination that the received input corresponds to a request to preview a virtual environment:
   providing a preview of the virtual environment; and
   refraining from providing an entrance transition effect; and
   in accordance with a determination that the received input corresponds to a request to enter the virtual environment:

causing a display of an avatar in the virtual environment; and providing the entrance transition effect, wherein while the entrance transition effect provided at the electronic device includes a transitory visual effect that is distinct from an appearance of the avatar and is provided with the avatar for a predetermined period of time, a second entrance transition effect different from the entrance transition effect is provided at a second electronic device different from the electronic device.

10. The non-transitory computer-readable storage medium of claim 9, the one or more programs further including instructions for:

further in accordance with a determination that the received input corresponds to the request to enter the virtual environment, causing a display of the virtual environment.

11. The non-transitory computer-readable storage medium of claim 9, the one or more programs further including instructions for:

further in accordance with a determination that the received input corresponds to the request to preview the virtual environment, refraining from causing a display of the avatar in the virtual environment.

12. The non-transitory computer-readable storage medium of claim 9, wherein the entrance transition effect is a default effect or an effect associated with a specific user.

13. The non-transitory computer-readable storage medium of claim 9, the one or more programs further including instructions for:

receiving a request to exit the virtual environment; and in response to receiving the request to exit the virtual environment, providing an exit transition effect.

14. The non-transitory computer-readable storage medium of claim 13, wherein the exit transition effect is a default effect, an effect selected by a user, or an effect associated with a specific user.

15. The non-transitory computer-readable storage medium of claim 9, wherein the virtual environment is a first virtual environment included in a second virtual environment.

16. The non-transitory computer-readable storage medium of claim 9, wherein the entrance transition effect is an effect selected by a user.

17. A method, comprising:

at an electronic device:

receiving an input;

in accordance with a determination that the received input corresponds to a request to preview a virtual environment:

providing a preview of the virtual environment; and refraining from providing an entrance transition effect; and in accordance with a determination that the received input corresponds to a request to enter the virtual environment:

causing a display of an avatar in the virtual environment; and providing the entrance transition effect, wherein while the entrance transition effect provided at the electronic device includes a transitory visual effect that is distinct from an appearance of the avatar and is provided with the avatar for a predetermined period of time, a second entrance transition effect different from the entrance transition effect is provided at a second electronic device different from the electronic device.

18. The method of claim 17, further comprising:

further in accordance with a determination that the received input corresponds to the request to enter the virtual environment, causing a display of the virtual environment.

19. The method of claim 17, further comprising:

further in accordance with a determination that the received input corresponds to the request to preview the virtual environment, refraining from causing a display of the avatar in the virtual environment.

20. The method of claim 17, wherein the entrance transition effect is a default effect or an effect associated with a specific user.

21. The method of claim 17, further comprising:

receiving a request to exit the virtual environment; and in response to receiving the request to exit the virtual environment, providing an exit transition effect.

22. The method of claim 21, wherein the exit transition effect is a default effect, an effect selected by a user, or an effect associated with a specific user.

23. The method of claim 17, wherein the virtual environment is a first virtual environment included in a second virtual environment.

24. The method of claim 17, wherein the entrance transition effect is an effect selected by a user.

* * * * *